Dec. 8, 1959 T. ENGEL 2,915,788
METHOD FOR THE MANUFACTURE OF LARGE SELF-SUPPORTING
ARTICLES FROM FINELY DIVIDED THERMOPLASTICS
Filed April 24, 1956 2 Sheets-Sheet 1

INVENTOR
THOMAS ENGEL

By Toulmin & Toulmin
Attorneys

Dec. 8, 1959 T. ENGEL 2,915,788
METHOD FOR THE MANUFACTURE OF LARGE SELF-SUPPORTING
ARTICLES FROM FINELY DIVIDED THERMOPLASTICS
Filed April 24, 1956 2 Sheets-Sheet 2

INVENTOR.
THOMAS ENGEL
BY Toulmin & Toulmin
ATTORNEYS

United States Patent Office 2,915,788
Patented Dec. 8, 1959

2,915,788

METHOD FOR THE MANUFACTURE OF LARGE SELF-SUPPORTING ARTICLES FROM FINELY DIVIDED THERMOPLASTICS

Thomas Engel, Offenbach (Main), Germany, assignor, by mesne assignments, to Vasco Industries Corp., New York, N.Y., a corporation of New York Application April 24, 1956, Serial No. 580,255

Claims priority, application Germany May 9, 1955

7 Claims. (Cl. 18—58)

For the manufacture of large numbers of hollow bodies which are to have an accurately shaped inner or outer surface it has long been known to use a model against which the material to be used is applied in the right shape and on which it will subsequently be cured. In general a hollow model is employed, which corresponds to the outward shape of the articles to be made, is filled with an excess of raw material, and after the formation of a crust lying against the model is emptied again; in the manufacture of porcelain figures, for example, this is a plaster model, on which by the withdrawal of water a clay deposit is formed, in the casting of pewter or the production of pewter articles a cooled model on which a crust is formed, in the treatment of latex or thermoplastic powder a heated model on whose surface a film is formed, etc.

It is further known to produce articles of a suitable shape in such a way from thermoplastics that the plastic material is introduced in molten, dough-like or solid condition into a heated, rotating hollow mould, and, after the latter has been cooled to just below the melting point, the article thus produced can be removed from the mould. In this method the shape of the articles is limited to some extent (tubular bodies).

For the manufacture of articles from thermoplastics injection moulding and extrusion pressing are widely employed methods. In the former process plastics liquefied by the application of heat and pressure are injected into metal moulds, while in the latter process plastics are compressed between suitable dies, with the application of heat and pressure, to form certain articles.

With these processes, too, there are definite limits to the size of the articles, above which limits the required equipment can no longer be used economically. It is also of interest that it has been found that articles made according to this process, especially when they have large surfaces, must have a given minimum wall thickness, because otherwise the injection pressures applied in practice would no longer suffice to fill the mould completely.

For the manufacture of articles for which the wall thickness is to remain below such a minimum, a special process was used by way of make-shift, according to which such articles are made by immersing a heated core for a short time in a plastic powder capable of forming a film in the melting range. The article forming on the surface of the core is subsequently removed from the core. By means of these processes relatively thin-walled articles are naturally obtained when a single homogeneous layer is used. Thus, if according to this process an article with a wall thickness of 0.5 mm. is to be made, it is already necessary to heat the equipment once more and to repeat the immersion of the core. For the reasons just mentioned it was hitherto impossible by the said processes to produce greater numbers of large self-supporting articles economically in one operation, because the layer thickness, which was required to be homogeneous and sharply determined, could not be attained at all, while in order to produce a wall thickness consisting of several layers it was necessary to carry out a number of operations corresponding to the number of layers. Moreover it appears from the result of the tests carried out that successively applied layers have a very low adhesive power and tend to be detached from one another again after some time. A further disadvantage consists in that owing to the multiple heating and cooling of the mould to be covered with a layer the molecular structure of the material may be impaired.

Now according to the invention it is possible to produce articles with large surfaces and thick walls in a rational way in a single heating operation, with a minimum of equipment, and at comparatively low moulding cost in a step-like manufacturing process in which, as the main feature, the layer thickness can be predetermined so that the latter is highly variable and can be adapted to practical requirements.

Plastics are applied in powdered, dough-like, coarsely or finely granular or liquid condition, said plastics being capable of forming a film under the influence of heat, preferably polyethylene in a finely granular form. It may be expedient, partly with a view to reducing the cost of the raw material and partly in order to improve the properties of the product in a particular sense, to mix the plastic material with fillers, e.g. of a mineral nature, such as calcium carbonate and the like and/or dyes.

It is a further feature of the process according to the invention that two or three tools are used, whose shape has been adapted relative to one another in accordance with their specific functions. Because the tools need withstand no pressure at all or, when use is made of a flexible core subjected to pressure, only this core and the moulding device have to take a relatively very low pressure, the manufacture of the tools can take place at a favourable cost. The heating device and the moulding device may in any case consist of thin tin plate. With a view to obtaining a smooth surface, the inside of the moulding device may e.g. be chromium-plated. Heat-resistant glass has also been found to be very suitable for the moulding device. In the sequel the heat-transferring member is always to be referred to as heating device, the inner mould as moulding device, and the corresponding core, if any, as core device.

The heating device serves for the heat transfer and has been designed so that the radiation of heat towards the moulding device is adjustable, in such a manner that special parts of the moulding device can, if desired, be exposed to increased heat radiation. In the same way in which a male die fits into a female die the moulding device is put in the similarly shaped heating device or conversely. During manufacture the inner wall and the inner contours of the moulding device will in any case be similar to the outer wall and to the outer contours respectively of the article to be produced in it.

In some cases it is effective to make use of a core device, which is introduced into the moulding device. The primary function of the core device is to reduce the quantity of plastic material required for the filling of the moulding device. This core device may be constructed to be rigid or flexible; in the latter case it is filled with water or air under pressure and transmits this pressure to the plastic material with which the mould is filled. If desired, the core device may also be adapted to be heated.

For the devices use is made of glass, metal, wood or ceramic or other mineral materials, while the devices in question need not all be made of the same material. Thus the heating device e.g. may consist of thin tin plate, while glass is employed for the moulding device and wood for the core device. Plastics and rubber, too, may be employed if they are sufficiently resistant to the temperatures occurring in the process.

In the process according to the invention, plastic material is first introduced into the cold moulding device, said moulding device being filled to the brim with plastic material. With a view to obtaining uniform wall thickness and enabling the process according to the invention to be carried out without any trouble, rationally, and unimpeded, it is essential that the moulding device should be filled outside the heating device, i.e. in cold condition. When releasing agents are necessary, these are applied or sprayed in the usual manner, before the filling operation, on the inside of the molding device. When it is desired to use the core device, the latter is first put in the moulding device and the space this obtained between the moulding device and the core device is filled with plastic material.

The moulding device prepared in this manner is put in the heating device. The heating device derives its heat, which causes the required temperature of the moulding device, from heat radiators provided on the outer wall or from a bath of heating oil, a current of hot air or the like flowing about the heating device. It may be expedient to cause the heat to act directly on the moulding device or on particular parts of it, which is brought about by the fact that the wall of the heating device has a larger or smaller number of perforations. In this case it is naturally impossible to use an oil bath. Owing to the action of the heat the plastic material is deposited in the form of a film on the inner wall of the moulding device. The layer thickness of the deposit is determined by the duration of the action of the heat and by the distance of the moulding device from the heating device, and also by the fact that the intensity of the action of the heat can be directed at particular parts of the moulding device. The degree of the action of the heat can be controlled by means of a suitable measuring device and is so adjusted that the structure of the material to be used cannot be impaired by depolymerization, decomposition or the like.

When the desired layer thickness has been attained, the core device—if it has been used—is removed from the moulding device. Any material that is not deposited on the inner wall of the moulding device is removed by suitable means (e.g. a suction device), the moulding device in general remaining in the heating device. By means of the heat that may further act on the moulding device a smooth surface of the plastic deposit can be obtained.

In this connection it is a highly essential feature of the process according to the invention that the formation of bubbles and the occlusion of air are avoided owing to the action of the heat from the outside to the inside, i.e. in the direction of the now disengaged surface of the moulding.

The moulding device is removed from the heating device and cooled e.g. to room temperature. It may be expedient to bring about the shrinkage and curing respectively of the material by a subsequent cooling process. The article thus made is then removed from the mould and treated further, if necessary.

The following articles can be manufactured by the process according to the invention:

Refrigerators
Boat parts
Car body parts
Acid jugs
Buoys
Stirring device containers
Pontoons
Exhauster casings
Tubes
Covers for engine aggregates
Bathing tubs
Cases
Containers for corrosive substances
Buckets
Sheets
Bars
Blocks
Vessels, etc.

These and other objects and advantages of the invention will be apparent upon reference to the following detailed description and accompanying drawings wherein.

*Example 1*

Figure 1:
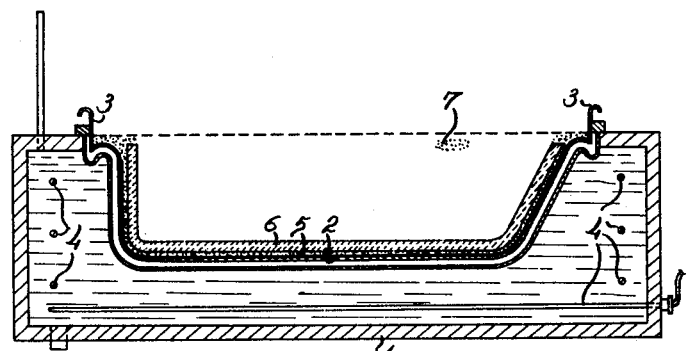
Figure 1 is an elevational view of apparatus useful in carrying out one embodiment of the invention.

The following is a description of the manufacture of a bathing tub, which is 600 mm. high, 600 mm. wide, and 1500 mm. long, and has a wall thickness of 2.5 mm., from polyethylene powder by means of oil-bath heating:

The equipment consists of a suitably insulated heating device 1 (Fig. 1) containing diphenyl oil, which is heated to a temperature of about 270° by means of an electrical heating coil 4 disposed on the bottom and along the sides of the container. In this heating device, which already has the contours of the bathing tub, a thin-walled tin-plate mould of 0.5 mm. thickness is put as the moulding device 2. This tin-plate mould is open at the top. The moulding surface of this moulding device proper accurately has the contours of the tub to be produced and fits into the heating device in such a way that the space between heating device and moulding device is as small as possible. On the moulding device have been provided two handles 3, by means of which it can be put in the heating device and removed from it.

The bathing tub is made in the following manner:

The diphenyl oil bath is heated to about 270°. After the introduction of the core device 6 the moulding device located outside the heating device is filled to the brim with polyethylene powder 7, after the inner wall of said moulding device has been spread with a releasing agent 5 (e.g. paraffin oil). Upon this the moulding device is put in the heating device by hand or by means of a pulley block. If desired, the moulding device may be covered with a view to preventing loss of heat and to keeping the powdered material pure. The heat radiation emanating from the heating device causes the polyethylene powder in the moulding device to melt, a coherent layer being formed on the inner walls of the moulding device, which layer will slowly grow and increase in thickness owing to the permanent action of the heat. Six minutes after the introduction of the moulding device the powdered polyethylene has produced a layer of 2.5 mm. overall thickness on the inner wall of the moulding device; 7 minutes after the introduction of the moulding device the layer of plastic has attained a thickness of 3 mm., while after 10 minutes it has already reached an overall thickness of 4 mm.

Figure 2:
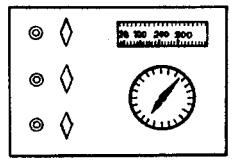
Figure 2 illustrates a chronometer useful in conjunction with the apparatus of Figure 1.

Mouldings of the said layer thickness can be used as self-supporting structural parts. The completion of the process is shown, after the desired layer thickness has been reached, by a chronometer (Fig. 2). The cover, if any, is removed from the moulding device. The core device is lifted out by hand or by means of a pulley block.

Any polyethylene powder that is still present in the mould and has not melted is removed with the aid of a suction device. The loose plastic powder that has adhered to the inside of the layer formed is brushed off with a broom.

The polyethylene film is already smoothed by this operation. The smoothing becomes complete when the moulding device is left in the heating device for some 5 minutes more. After this the moulding device is removed from the heating device and cooled for some 3 minutes in a water tank of about 15° C. in order that the film may densify and thus shrink. After the cooling the moulding can be taken out and can be used or treated further respectively (fitting of the drainage pipe). After the removal of the moulding device the heating device, which is kept at a constant temperature, is ready to receive another moulding device, thus ensuring continuous operation. In general at least two moulding devices will be used for one heating device; when the first moulding device, after being filled, is put in the heating device and the melting process takes place, the second moulding device is filled and put in readiness. The duration of the whole manufacturing process for the above-mentioned bathing tub, which has a total weight of about 10 kg., is 14 minutes.

*Example II*

Figure 3:
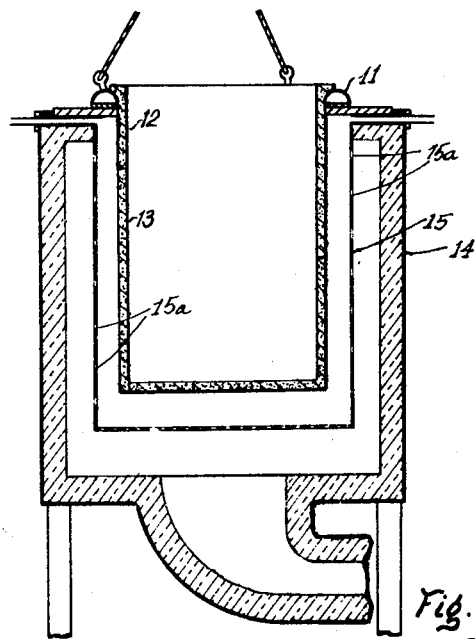
Figure 3 is a vertical view illustrating a further embodiment of an apparatus arrangement useful in the practice of the invention and in which the plastic material shown is being subjected to the heating device.
Figure 4:
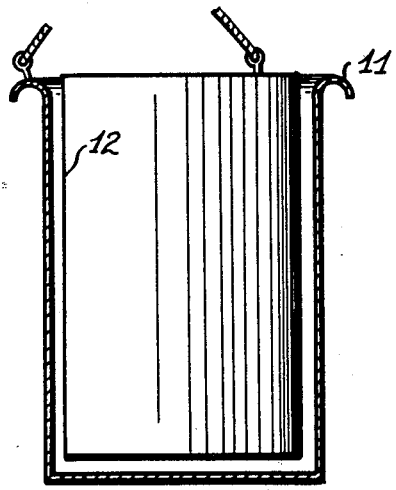
Figure 4 is a view illustrating a first step in carrying out the process of invention utilizing the apparatus arrangement shown in Figure 3 wherein the core is being inserted into the moulding device.
Figure 6:
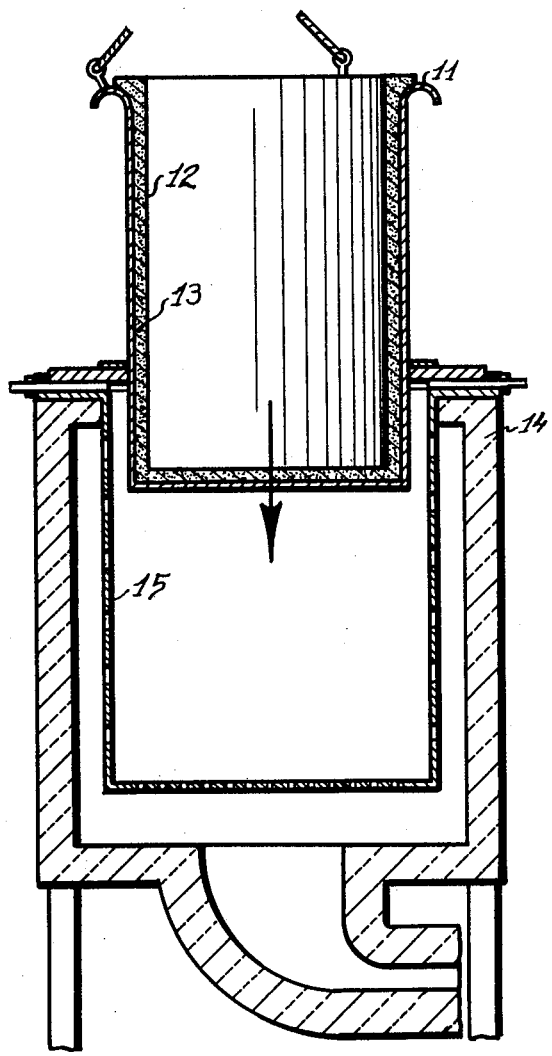
Figure 6 illustrates the insertion of the combination of the moulding device and core device into the heating arrangement.
Figure 5:
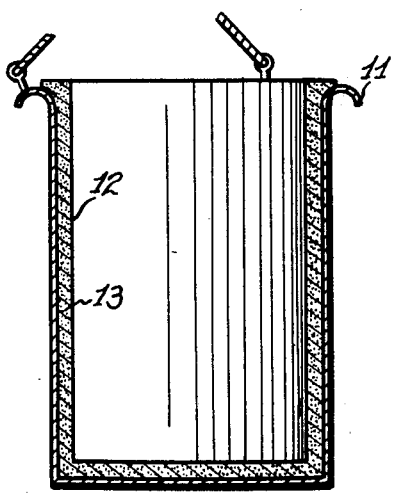
Figure 5 is a further step in the arrangement of the apparatus of Figure 4 and illustrates the condition where the spacing defined by the core and mould is filled with plastic material.

The following is a description of the manufacture of a 350-litre container of self-supporting construction and with a reinforced bottom:

The moulding device 11 (Fig. 3) is sprayed in a manner known per se with a releasing agent, the core device 12 is suspended in it, and then the space between the two devices is filled with plastic powder 13, in this case with polyethylene.

The system is now ready to be put in and is placed in the heating device 14. The hot air—in this case it is formed by the gases of combustion of an oil-fired heating apparatus with a temperature of about 1400° C. with a feeding capacity of 12 m.³ per minute—then flows about the whole heating device 14, which is caused by the adjustable perforations 15a of the heat distributor 15, and in particular the bottom surface, because here, on account of the special loads to which the moulding is to be exposed during its subsequent use, a greater layer thickness is desired. After only two minutes a plastic deposit of 1.5 mm. is already found to have formed, which deposit after another 3 minutes has reached a thickness of 4 mm. At this moment the core device 12 is pulled out and the residual powder is removed, but without the moulding device 11 being taken from the heating device 14.

After another two minutes the remaining occluded air has been forced by the heat of radiation of the hot air, coming from the rear, towards the surface from the layer formed, as a result of which an exceptionally high gloss of the layer is obtained at the same time, without the thermoplastic material being subjected to temperature variation.

The process is then complete.

The moulding device 11 is taken from the heating device 12 by means of a crane. After being cooled, the finished moulding can be removed and conveyed to a further stage of treatment, e.g. removal of the flash. Meanwhile a second and a third moulding device have naturally been prepared, so that about every 7 minutes one 350-litre container with a lateral wall thickness of 4 mm. and a bottom thickness of 5.5 mm. is completed.

What I claim is:

1. The method of producing shaped self-supporting articles from thermoplastic material which comprises: filling a molding receptacle, a wall of which presents an inner surface having the configuration of an article to be produced, with a mass of the thermoplastic material in finely divided solid form, thereby covering all parts of said surface with a thickness of said material in excess of that required to form the wall thickness desired for said article, said surface being at a temperature insufficient to coalesce particles of said material; while holding said mass static relative to said surface, heating said mass through said wall from that side of said mass which is in contact with said surface to coalesce particles of said material; continuing said heating until particles of said material have coalesced to a depth within said mass corresponding to said desired wall thickness; and then removing the excess of finely divided material from the resulting coherent layer.

2. The method of producing shaped self-supporting articles from thermoplastic material which comprises: filling a molding receptacle, a wall of which presents an inner surface having the configuration of an article to be produced, with a mass of the thermoplastic material in finely divided solid form, thereby covering all parts of said surface with a thickness of said material in excess of that required to form the wall thickness desired for said article, said surface being at a temperature insufficient to coalesce particles of said material; while holding said mass static relative to said surface, heating said mass through said wall from that side of said mass which is in contact with said surface to coalesce particles of said material; continuing said heating until particles of said material have coalesced to a depth within said mass corresponding to said desired wall thickness; then removing the excess of finely divided material from the resulting coherent layer; and thereafter further heating said layer to fuse material therein and smoothen the side thereof away from said surface.

3. The method of producing shaped self-supporting articles from thermoplastic material which comprises: filling a molding receptacle, a wall of which presents an inner surface having the configuration of an article to be produced, with a mass of the thermoplastic material in finely divided solid form, thereby covering all parts of said surface with a thickness of said material in excess of that required to form the wall thickness desired for said article, said surface being at a temperature insufficient to coalesce particles of said material; while holding said mass static relative to said surface heating said mass through said wall from that side of said mass which is in contact with said surface to coalesce particles of said material; continuing said heating until particles of said material have coalesced to a depth within said mass corresponding to said desired wall thickness; then removing the excess of finely divided material from the resulting coherent layer; thereafter further heating said layer to fuse material therein and smoothen the side thereof away from said surface; and then cooling said layer.

4. The method of producing deep self-supporting shaped articles from thermoplastic material which comprises: filling with a mass of thermoplastic material in finely divided solid form, to at least the location of the brim of the article to be produced, a hollow receptacle the inner surface of which constitutes a mold surface having the configuration of said article, said mold surface being at a temperature insufficient to coalesce particles of said material and said mass providing over all parts of said surface a thickness of said material in excess of that required to form the wall thickness desired for said article; while holding said mass static relative to said surface, heating said mass only from that side thereof which is in contact with said surface to coalesce particles of said material, and continuing said heating until said particles have coalesced to a depth within said mass corresponding to said desired wall thickness; and then removing the excess of finely divided material from the resulting coherent layer.

5. The method of producing deep self-supporting shaped articles from thermoplastic material which comprises: filling with a mass of thermoplastic material in finely divided solid form, to at least the location of the brim of the article to be produced, a hollow receptacle the inner surface of which constitutes a mold surface having the configuration of said article, said mold surface being at a temperature insufficient to coalesce particles of said material and said mass providing over all parts of said surface a thickness of said material in excess of that required to form the wall thickness desired for said article; while holding said mass static relative to said surface, heating said mass only from that side thereof which is in contact with said surface to coalesce particles of said material, and continuing said heating until said particles have coalesced to a depth within said mass corresponding to said desired wall thickness; then removing the excess of finely divided material from the resulting coherent layer; thereafter further heating said layer to fuse material therein and smoothen the side thereof away from said surface; then cooling said layer; and then removing the product from the receptacle.

6. The method of producing deep self-supporting shaped articles from thermoplastic material which comprises: placing a core into a hollow receptacle an inner surface of which constitutes a mold surface having the configuration of an article to be produced, said core and mold surface forming between themselves a space of greater width over all parts of said surface than the wall thickness desired for said article; filling said space to at least the location of the brim of said article with thermoplastic material in finely divided solid form while said mold surface is at a temperature insufficient to coalesce particles of said material; while holding said mass static relative to said surface, heating said mass only from that side thereof which is in contact with said surface to coalesce particles of said material, and continuing said heating until said particles have coalesced to a depth within said mass corresponding to said desired wall thickness; and then removing the excess of finely divided material from the resulting coherent layer.

7. The method of producing deep self-supporting shaped articles from polyethylene which comprises: filling with a mass of finely divided polyethylene, to at least the brim location of the article to be produced, a thin-walled hollow receptacle the inner surface of which constitutes a mold surface having the configuration of said article, said receptacle being at a temperature insufficient to fuse together particles of the polyethylene, the thickness of said mass being substantially greater over all parts of said surface than required to form a coalescent layer of said polyethylene having the wall thickness desired for said article; while holding said mass static relative to said surface, contacting the outside of said receptacle with a heating fluid at a regulated temperature sufficient to fuse together the particles of the polyethylene; by the flow of heat from said heating fluid through said receptacle and from said inner surface into said mass, progressively coalescing particles of the polyethylene until the same are coalesced to a depth within said mass corresponding to said desired wall thickness; then discharging the excess of finely divided polyethylene from said receptacle; then further heating said receptacle to use and smoothen the inner surface of the coalesced material; then cooling the receptacle and hardening the material therein; and then removing the product from the receptacle.

References Cited in the file of this patent

UNITED STATES PATENTS

| | | |
|---|---|---|
| 2,143,576 | Replogle et al. | Jan. 10, 1939 |
| 2,405,329 | Ruebensaal | Aug. 6, 1946 |
| 2,505,807 | Stott | May 2, 1950 |
| 2,527,387 | Arndt | Oct. 24, 1950 |
| 2,611,926 | Grannis | Sept. 30, 1952 |
| 2,644,198 | Crawford | July 7, 1953 |
| 2,736,925 | Heisler et al. | Mar. 6, 1956 |

FOREIGN PATENTS

| | | |
|---|---|---|
| 567,012 | Great Britain | Jan. 24, 1945 |